US008006241B2

(12) United States Patent
Dias

(10) Patent No.: US 8,006,241 B2
(45) Date of Patent: Aug. 23, 2011

(54) AUTOMATIC SOFTWARE INSTALLATION AND CLEANUP

(75) Inventor: Eric W B Dias, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 11/765,530

(22) Filed: Jun. 20, 2007

(65) Prior Publication Data

US 2008/0320466 A1    Dec. 25, 2008

(51) Int. Cl.
*G06F 9/445* (2006.01)
(52) U.S. Cl. .................... 717/174; 717/173; 717/178
(58) Field of Classification Search .................. 717/173, 717/178
See application file for complete search history.

(56) References Cited

U.S. PATENT DOCUMENTS

| | | | |
|---|---|---|---|
| 5,684,996 A | 11/1997 | Westerholm et al. | |
| 5,717,930 A | 2/1998 | Imai et al. | |
| 5,742,829 A | 4/1998 | Davis et al. | |
| 5,937,411 A | 8/1999 | Becker | |
| 5,978,590 A | 11/1999 | Imai et al. | |
| 6,006,035 A * | 12/1999 | Nabahi | 717/175 |
| 6,016,400 A | 1/2000 | Day et al. | |
| 6,282,712 B1 | 8/2001 | Davis et al. | |
| 6,286,051 B1 | 9/2001 | Becker et al. | |
| 6,301,710 B1 | 10/2001 | Fujiwara | |
| 6,353,926 B1 * | 3/2002 | Parthesarathy et al. | 717/170 |
| 6,405,362 B1 | 6/2002 | Shih et al. | |
| 6,425,126 B1 * | 7/2002 | Branson et al. | 717/168 |
| 6,513,040 B1 | 1/2003 | Becker et al. | |
| 6,535,894 B1 | 3/2003 | Schmidt et al. | |
| 6,587,838 B1 | 7/2003 | Esposito et al. | |
| 6,944,859 B2 * | 9/2005 | Bunger | 717/178 |
| 7,003,767 B2 * | 2/2006 | Larkin | 717/172 |
| 7,062,550 B1 | 6/2006 | Hutchinson et al. | |
| 7,124,409 B2 | 10/2006 | Davis et al. | |
| 7,185,335 B2 | 2/2007 | Hind et al. | |
| 7,287,095 B2 * | 10/2007 | Nagumo | 709/247 |

OTHER PUBLICATIONS

IBM Redbooks, "An Automated Software Distribution Solution", Sep. 2000, First Edition, 192 pages.*
Porter et al. "Operating System Transactions", 2009, p. 161-176.*

* cited by examiner

*Primary Examiner* — Wei Zhen
*Assistant Examiner* — Phillip H Nguyen
(74) *Attorney, Agent, or Firm* — Mark C. Vallone

(57) ABSTRACT

An application installation and removal system and method comprising: an operating system for controlling and maintaining resources on a computer; and an event monitor configured to detect availability of a new software to be installed on the client; receive a list of new software on the client; perform installation of the software on the client wherein performing installation comprises creating a record of all user defined applications on the client immediately prior to performing the installation in a log file; installing the new software on the client; rebooting the client after the installation of the new software on the client; and resorting all the user defined applications recorded in the log file to the same state as the user defined applications were prior to the installation of the new software.

33 Claims, 2 Drawing Sheets

AUTOMATIC SOFTWARE INSTALLATION AND CLEANUP

FIELD OF INVENTION

This invention relates generally to software installation on a client over a network, and more specifically to returning an application active running on the client to the same state after completion of software installation as the client was prior to installation of the software.

BACKGROUND OF THE INVENTION

Typically, large multinational corporations have a distributed computing environment with distributed systems containing a large number of computing resources, for example computers, PDA's etc., spread across wide geographical areas that are networked together. This type of environment makes it difficult and expensive to manage such computing resources in terms of providing software installation, support and maintenance across the corporation. That is, an administrator of such a distributed system has to visit each computing resource in order to manage the resource, with a significant cost being attached to managing the resources in this type of environment stemming from software installation, support, and maintenance. In fact, the initial purchase price of software may be only a small portion of the total cost associated with managing the computing resources.

Systems have been developed that, upon user initiation, install software from a master computer (herein after also referred to as a server) to one or more slave computers (hereinafter also referred to as a client) over a network. For example, an IBM™ product for performing such a remote automatic software installation and cleanup is EZUpdate®, which is used to keep clients up to date with the latest level of critical applications and updates. Such systems configured for automatic software installation and cleanup conventionally include an event monitor (also sometimes referred to an agent) installed on the client and/or on the server, and configured to monitor the clients within a given network to help manage software updates on the clients.

For example, in some typical cases, the agent is configured to wake up at fixed intervals to check for updates on a server and/or whenever an update is made on the server, the agent becomes active and alerts the client regarding the availability of the new application and/or update. When the agent detects that a new application or update is available, which needs to be installed on the client, the agent typically performs a client authentication and runs a script which is configured to fetch the application and/or update over a secure channel from the server and install the application and/or update on the client. During the installation process, temporary files are created on the client, and the temporary files are erased, cleaning up the resources of the client after the installation is completed.

The applications and/or updates are typically classified into different categories, such as critical, recommended, optional, etc., allowing the client user to make a selection as to when the installation can be accomplished on the client. Typically when applications and/or updates are critical, the applications and/or updates must be installed on the client instantaneously, whereas recommended applications and/or updates may be installed at a later time or may not be installed. If the applications and/or updates are critical and need to be installed instantaneously, i.e., within a given timeframe, the client system/device needs a reboot for the critical application and/or update to be effective, and in such cases, once the installation process is started, the agent controls the installation and the reboot of the client, typically via a script. A disadvantage with the present process is that even if a critical application and/or update is to be installed on the client, the users on the client typically will not perform such an installation, thereby making the client vulnerable to malicious attacks. A further disadvantage is that if the system is not rebooted after the installation of such a critical application and/or update, the system is still vulnerable to malicious attacks. A further disadvantage is that the user on the client needs to save a number of applications that he is working on before performing such an update, and this interferes with the user's work schedule.

For example, a client has installed Microsoft Windows® XP operating system. A critical security patch has been released by Microsoft® to plug a vulnerability that has been detected without which the client will be vulnerable to any malicious attacks. This means that the security patch needs to be installed on the client immediately, and for the security patch to be effective after installation in the client, the client will have to be rebooted. The agent on the client and/or the server detects that a new application/update is available and intimates the client by prompting the client to install the new application and/or update by means of an indicator. The installation of the new application/update is required and critical for the client. The client is then prompted for authentication such that the process of installation may begin. Before beginning the installation process, if the channel to install the product is not secure, then either the client may be prompted to terminate the installation or create a secure channel for installation. The agent is configured to run a script on the client, which will fetch the security patch from the server and then subsequently perform installation of the security patch on the client. During the installation process temporary files are created on the client, which are removed once the installation is completed and/or the client is rebooted, thereby releasing the resources used on the client, and a report is generated indicating that the installation is successful or not successful and any other related information. Once the security patch is installed to plug the vulnerability, the security patch (also referred to as a software update) must become active, and for this, the client system needs to be rebooted. In many instances, a user of the client would typically like to defer the reboot because many other critical applications may be in use by the client, leading to loss of information or making the user backup several of these applications, thereby making the process not user friendly. Typically, such deferred reboot of the client delays the implementation of the security patch, and thereby causes the client to malfunction or become vulnerable to malicious attacks.

Without a way for improving the method for automatically installing new software applications and/or software updates on a client the promise of this technology may never be fully achieved.

SUMMARY OF THE INVENTION

An application installation and removal system and method comprising: an operating system for controlling and maintaining resources on computer; and an event monitor configured to detect availability of a new software to be installed on the client; receive a list of new software on the client; perform installation of the software on the client wherein performing installation comprises creating a record of all user defined applications on the client immediately prior to performing the installation in a log file; installing the new software on the client; rebooting the client after the installation of the new software on the client; restoring all the user defined applications recorded in the log file to the same state as the user defined applications were prior to the installation of the new software. In one embodiment, the event monitor is configured to provide a visual indicator on the client. An advantage of the present invention is that the system restores all user defined applications to the same state as the applications were immediately prior to performing the installation on the client thereby making the installation process more user friendly and efficient.

BRIEF DESCRIPTION OF THE DRAWINGS

These and further aspects of the present invention will become apparent from and will be elucidated with respect to the embodiments described hereinafter with reference to the accompanying drawings. The drawings illustrate the embodiments of the invention, and together with the description, serve to further explain the principles of the invention. In the drawings

DETAILED DESCRIPTION

Figure 1:
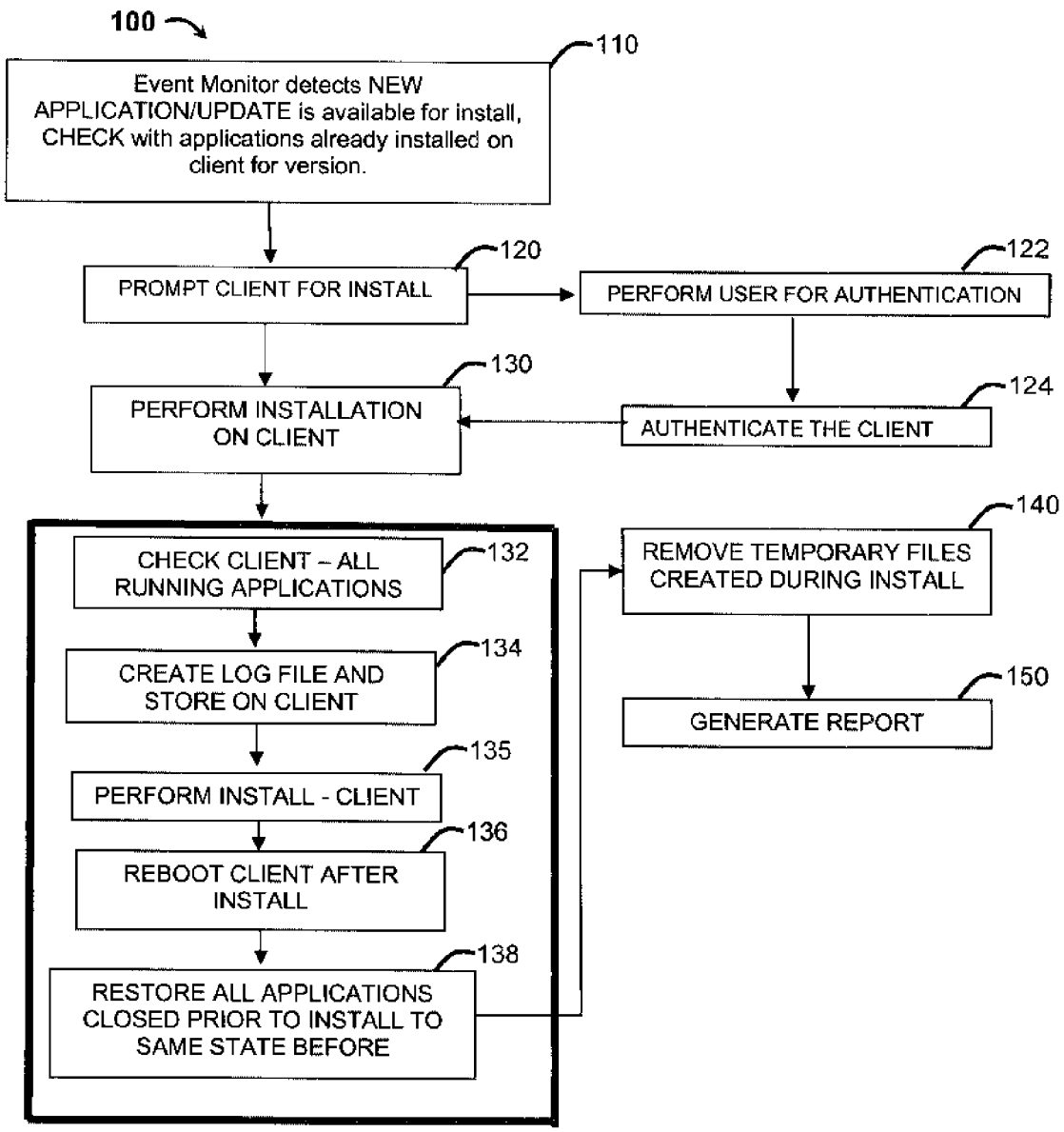
FIG. 1 illustrates a method of automatically installing software and cleaning the temporary files created on the client in accordance with the present invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. Where reference is made in any one or more of the accompanying drawings to steps and/or features, which have the same reference numerals, those steps and/or features have for the purposes of this description the same function(s) or operation(s), unless the contrary intention appears. It should also be apparent to a person skilled in the art that described herewith is a specific case of software installations and cleanup on a client, and that there are several such products and/or processes available for automatic software installation and cleanup and all of which in one form or the other fall under the scope of the present invention.

FIG. 1 illustrates a method 100 for automatically installing software and cleaning the temporary files created on the client in accordance with the present invention. The method 100 includes typically an event monitor (hereinafter also referred to as an agent) installed on the client, for example a computer system, PDA, etc., and the event monitor being configured to monitor the client and/or a server for advantageously installing new software applications and/or software updates on the client. In step 110, the event monitor, which can be software installed on the client or hardware with embedded software, is kept active on the client when an operating system of the client is active. The event monitor is configured to detect that a new software application and/or a software update has been made available for installation on the client. Once the event monitor detects that a new software application and/or a software update is available for installation on the client, the event monitor is configured to optionally check with the client if the new software application and/or update has been already installed or not on the client. If the event monitor detects that the new software application and/or software update is already installed on the client, the event monitor terminates the installation process, or else the event monitor continues with the method 100 for installation of the new software application and/or the software update.

In step 120, when the event monitor scans the client and detects that the new application and/or the software update is not available on the client, the event monitor prompts for installation of the new software application and/or the software update on the client. In one embodiment the prompt can be provided by means of an indicator such as a pop-up window, a blinker, or both in the system tray of the client until such time that the user has accessed the indicator. In a further embodiment, if the client involves a single sign-on, the event monitor can proceed to step 130 wherein the event monitor begins performing installation of the new software application and/or the software update on the client, after checking with the user on the client. In yet a further embodiment, the event monitor can perform the installation by activating a script such as an auto-run program that is programmed to perform and complete the installation process. It should be apparent to a person skilled in the art that there are various different ways for performing such installation of new software applications and/or software updates on a client, and such method would generally fall within the scope of this invention.

Typically, for security reasons, once the client is provided with the indicator in step 120 prompting the client for installation of the new software application and/or the software update, and before performing the installation on the client in step 130, the event monitor is configured to perform authentication of the client and/or a user of the client, such that a secure channel may be established for the installation process. In step 122 the event monitor prompts a user on the client to enter, for example, a "userid" and a "password" for authenticating the user on the client. In case of a single sign-on, the event monitor may be configured to check the authentication with the single sign-on server. The event monitor performs authentication of the client in step 124, and once the client is authenticated in step 124, the client is interfaced with the server or another device that will provide the new software application and/or the software update to be installed on the client, and then proceed to step 130.

In step 130 the new software application and/or the software update available for installation on the client will be installed on the client. As described previously, this installation can be controlled by the event monitor or the event monitor may assign the task of performing the installation to another software program. The client, after completing the authentication process in step 124, is now ready for performing the installation in step 130. The installation process 130 in accordance with the present invention follows the following steps.

First, in step 132, the event monitor is configured to detect all applications that are open and running on the client system. These do not include applications and programs that are executed during the start-up of the client system or those controlled by the operating system, such as a task manager (taslmgr.exe) which is an operating system related application or applications such as Lotus® Quickstart, Winzip®, Acrobat® Assistant, etc., which may be included in the start-up menu of the client. Typical examples of applications that are opened by users on the client would comprise this list such as word processors, email clients, user interfaces, databases and the like.

Once the event monitor checks the client for all applications that are running and/or active on the client, which do not form part of the operating system and/or the start-up package, defined hereinafter as user defined applications, in step 134, the event monitor is configured to create a log file which contains details of all the user defined applications. For example the log file in one embodiment could be a file that contains details in the following format:

```
c:\programfile\notes\notes.exe    inbox pwd:=xxxxxxxxx(encrypted)
http://w3.ibm.com/bluepages/simpleSearch.wss?searchBy=
Name&location=All+locations&searchFor=Eric+Dias
http://www.freepatentsonline.com/20040267848.html
http://www.freepatentsonline.com/5805403.html
c:\office\current\test1.doc       Page 4, Line 20;
c:\work\aus920070483.doc          Page 2, Line 24;
d:\test\pat6034403.pdf            Page 10, (line 3)
etc.
```

It should be apparent to a person skilled in the art that the format shown above is only illustrative and in no way limits the scope of this invention. For example, the event monitor can choose to store the log file in a format chosen by the organization or the user, for example including other parameters that may be relevant to identifying the applications in a unique way. For example, when word processing documents are open, it is advantageous to store the page numbers and the current page number where the cursor is placed as indicated in the log described above. If the event monitor is capable of detecting the line number of where the cursor was last placed, then the line number may as well be recorded. Hence, in the example log file described above for the document "pat6034403.pdf" the line number is indicated in brackets, which indicates that the page number may be an optional parameter. The advantage of the present invention is to make a record of all user defined applications on the client, especially those applications that are not included in the start-up or associated with the operating system.

Once the log file has been created in step 134, the event monitor is configured to perform installation of the new software application and/or software update on the client. The event monitor in one embodiment may run a shell script to advantageously install the new software application and/or software update. Assuming that the nature of the new software application and/or software update are critical and for the new software application and/or the software update to be effective on the client, the client should undergo a reboot. The event monitor is typically configured to automatically reboot the client after the installation has been performed in step 136. During the process of performing a reboot on the client, all applications that are active and open on the client will be closed and the memory will be flushed. In step 136, the event monitor reboots the client after the installations and is then configured to restore all operating system related applications and applications included in the start-up package. However all other applications that were active and running as recorded in the log file, the user defined applications, will not be opened again automatically. The user of the client will have to remember the applications that had been open and open those applications again.

Once the reboot is completed in step 136, the event monitor first checks for a log file on the client and in step 138, the event monitor is configured to restore all applications that have been recorded, the user defined applications, in the log file to the same state as were before the installation process had started. Once all the user defined applications have been restored to the same state as prior to the installation of the new software application and/or software update, the event monitor can be configured to perform a self consistency check on the client. After the restore has been completed in step 139, in step 140, all temporary files that have been created during the installation process are cleaned from the client and in step 150 a report is generated indicating whether the installation has been successful or not, and whether all user defined applications have been restored to the same state as prior to the installation. If any error is found in the report, the installation can be performed again, with steps 120 to 150 repeated.

Those skilled in the art will appreciate that the invention may be practiced with other clients such as computer systems, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, modules may be located in both local and remote memory storage devices.

Figure 2:
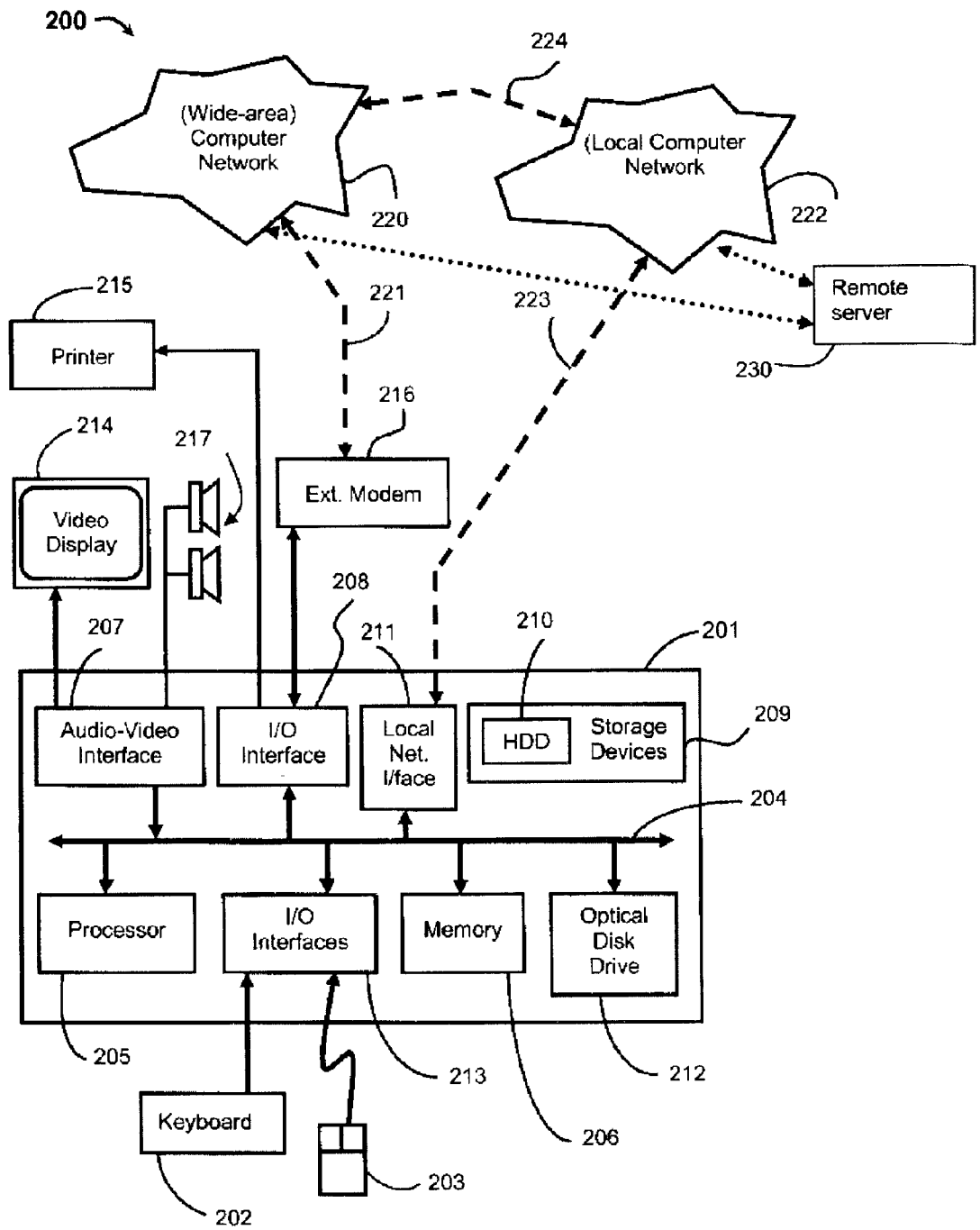
FIG. 2 illustrates a system on which the method of FIG. 1 may be implemented.

FIG. 2 illustrates a system 200 on which the method of FIG. 1 may be implemented. The processes described may be implemented as software, such as, as one or more application programs executable within the system 200. In particular, the steps of the process may be realized by instructions in the software that are carried out within the system 200. The instructions may be formed as one or more program code modules, each for performing one or more particular tasks. The software may be stored in a computer readable medium, for example storage devices. The software is loaded into the system 200 from the computer readable medium, and then executed by the system 200. A computer readable medium having such software or computer program recorded on it is typically referred to as a computer program product. The use of the computer program product in the system 200 preferably effects an advantageous apparatus installation of new software applications and/or software updates on the system 200.

FIG. 2 illustrates a computer system 200, hereinafter also referred to as a client or a client computer system, formed by a computer module 201, input devices such as a keyboard 202 and a mouse pointer device 203, and output devices including a printer 215, a display device 214 and loudspeakers 217. An external Modulator-Demodulator (Modem) transceiver device 216 may be used by the computer module 201 for communicating to and from a communications network 220 via a connection 221. The network 220 may be a wide-area network (WAN) such as the Internet or a private WAN. Where the connection 221 is a telephone line, the modem 216 may be a traditional "dial-up" modem. Alternatively, where the connection 221 is a high capacity (e.g. cable) connection, the modem 216 may be a broadband modem. A wireless modem may also be used for wireless connection to the network 220. In one embodiment, the client computer system 200 is coupled to a remote server 230 over the network. The new software applications and/or the software updates that are required to be installed on the client computer system 200 may be advantageously stored on the remote server 230 or may can be installed on the client computer system 200 from the storage devices 209.

The computer module 201 typically includes at least one processor unit 205, and a memory unit 206 for example formed from semiconductor random access memory (RAM)

and read only memory (ROM). The computer module 201 also includes a number of input/output (I/O) interfaces including an audio-video interface 207 that couples to the video display 214 and loudspeakers 217, an I/O interface 213 for the keyboard 202 and mouse 203 and optionally a joystick (not illustrated), and an interface 208 for the external modem 216 and printer 215. In some implementations, the modem 216 may be incorporated within the computer module 201, for example within the interface 208. The computer module 201 also has a local network interface 211 which, via a connection 223, permits coupling of the computer system 200 to a local computer network 222 known as a Local Area Network (LAN). As also illustrated, the local network 222 may also couple to the wide area network 220 via a connection 224, which would typically include a so-called "firewall" device or similar functionality. The network interface 211 may be formed by an Ethernet™ circuit card, a wireless Bluetooth™ or an IEEE 802.11 wireless arrangement.

The interfaces 208 and 213 may afford both serial and parallel connectivity, the former typically being implemented according to the Universal Serial Bus (USB) standards and having corresponding USB connectors (not illustrated). Storage devices 209 are provided and typically include a hard disk drive (HDD) 210. Other devices such as a floppy disk drive and a magnetic tape drive (not illustrated) may also be used. An optical disk drive 212 is typically provided to act as a non-volatile source of data. Portable memory devices, such optical disks (eg: CD-ROM, DVD), USB-RAM, and floppy disks for example may then be used as appropriate sources of data to the computer system 200.

The components 205 to 213 of the computer module 201 typically communicate via an interconnected bus 204 and in a manner which results in a conventional mode of operation of the computer system 200 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 210 and read and controlled in execution by the processor 205. Intermediate storage of such programs and any data fetched from the networks 220 and 222 may be accomplished using the semiconductor memory 206, possibly in concert with the hard disk drive 210. In some instances, the application programs may be supplied to the user encoded on one or more CD-ROM and read via the corresponding drive 212, or alternatively may be read by the user from the networks 220 or 222. Still further, the software can also be loaded into the computer system 200 for execution and/or processing. Examples of such media include floppy disks, magnetic tape, CD-ROM, a hard disk drive, a ROM or integrated circuit, a magneto-optical disk, or a computer-readable card such as a PCMCIA card and the like, whether or not such devices are internal or external of the computer module 201.

The event monitor can be loaded onto the memory of the system and can be active when the client computer system 200 is active. In one embodiment, the event monitor can be loaded on the client computer system and configured to periodically check the remote server 230 for any new software application and/or software updates on the server. If the event monitor detects a new software applications and/or a software update, the event monitor is configured to perform the method steps as described in FIG. 1 to install the new software application and/or the software update on the client 200. In an alternate embodiment, each of the client computer system 200 and the remote server 230 may be loaded with event monitors. Whenever a new software application and/or a software update is hosted on the server, the event monitor on the remote server 230 is configured to broadcast to the event monitor on the client 200 coupled to the server 230 over the network that a new software application and/or software update is available for installation on the client. The event monitor on the client 200 is configured to perform installation of the software on the client as described previously, and on completion of the installation and restoring of the user defined applications, transfer control back to the server after successful installation on the client. In yet a further embodiment, the new software application and/or software update may be provided by the storage device 209, 212. The event monitor reads the storage device 209, 212 and if new software applications and/or software updates are made available through such media, the client is configured to perform the installation as described for FIG. 1, without or without performing authentication.

The operations disclosed may alternatively be implemented in dedicated hardware such as one or more integrated circuits performing the functions or sub functions of the described processes. Such dedicated hardware may include graphic processors, digital signal processors, or one or more microprocessors and associated memories.

For example, consider a client computer system with the Microsoft Windows® XP operating system. A critical security patch has been released by Microsoft® to plug a vulnerability detected. The new security patch (software update) is a critical application for the operating system, which if not installed can lead to the client being exposed to malicious elements, thereby making the client vulnerable. Being critical in nature, the security patch must be installed on the client at the earliest possible instant. Once the new software patch has been installed on the client, the client should undergo a reboot before the security patch becomes effective on the client.

The event monitor loaded on the client detects that a security patch has been released and should be installed on the client at an earliest possible instance. As soon as the event monitor detects that the security patch is released for the operating system, the event monitor is configured to check the client operating system if the security patch is already installed. If the security patch is already installed, the event monitor terminates the installation of the security patch. If the security patch is not installed on the client, the event monitor prompts the client that new software is available for installation. This is done by providing the user of the client with an indicator such as a pop-up window or a blinking indicator or both or any other type of indicator which is suggestive to the client that new software applications and/or software updates are available for install on the client.

In one embodiment, the user can unselect all software provided in the list which need not be installed and request the event monitor to install the selected software. By default all software is are selected when displayed to the user of the client. Once the indicator is noticed, the client can authenticate itself before performing the installation as described previously. Since the security patch is available at a remote location where it may be hosted on a server, the server may belong to the corporate network or to a third party vendor, and so the client needs to perform authentication such that the event monitor can access the security patch to be installed on the client.

Before installing the security patch on the client, the event monitor performs a check on all applications, the user defined applications, that are open, active and/or running on the client. For example, the event monitor detects that the following application are open at the time installation on the client needs to be performed:

---
http://www.freepatentsonline.com/5805403.html
c:\office\current\test1.doc    Page 4, Line 20.

---

The event monitor creates a log file containing the specific details of these user defined applications. It should be noted here that applications used by the operating system and those in the start-up will automatically start after installation and reboot, and these are not stored in the log file. Once the log file has been created and stored in the client, the event monitor performs installation of the security patch on the client. The installation may be performed by running pre-defined scripts that are interfaced with the event monitor.

After completion of the installation process, since the security patch has to be effective on the client, the client has to undergo a reboot. All user defined applications that are open are typically closed and the memory is flushed during the reboot process. After the reboot, all operating system related applications and those in the start-up are automatically started. Advantageously, in accordance with the present invention, the event monitor, after the reboot of the client, is configured to read the records of the log file and then configured to restore all user defined applications recorded in the log file to the same state as prior to performing the installation. For example, the Internet Explorer browser is opened and directed to the link http://www.freepatentsonline.com/5805403.html. Subsequently, the document "test1.doc" is opened in a Microsoft® word processor, and the cursor is directed to page 4 line 20, and advantageously enables the cursor page to be viewed on the display.

After all the user defined applications are opened to the same state as prior to installation, the event monitor is then configured to remove all temporary files created during the installation process and generate a detailed report that the installation of the security patch was successful and the list of applications that have been restored.

In one embodiment, in accordance with the present invention, after the authentication has been performed, the event monitor requests the server to perform the installation on the client as is well known to a person skilled in the art. This may be typically done by executing a number of batch files in the background, which are controlled by the event monitor.

In a further embodiment, consider a client and a server coupled over the Internet, for example a server at a Bank and an ATM machine client. An applications update is required on the client. The same process can be followed to advantageously install the new application on the client, with authentication details being stored in an encrypted file which can be accessed by the client to perform the installation and restore all applications running on the client prior to installation.

In a farther embodiment, consider a client (for example a Computer Tomography (CT) machine) in a hospital/health care unit and a server (provider of imaging software like IBM®), the client coupled to the server. Whenever an update is issued, the agent is configured to check if the client is in use or not. If the client is currently in use by the a scanner and in the process of gathering data, the installation can be deferred until such data gathering is completed. After completion of this process of gathering data the event monitor can access the client details on the client for authentication or can prompt the user for authentication and then perform installation of the updates and then restore all user defined applications which were in use prior to the installation of the update.

An advantage is that critical patches can be installed timely and deferred reboot can be avoided to a large extent thereby making the system secure and robust. It should be apparent to a person skilled in the art that any system which requires an automatic software installations and cleanup having a client and server fall within the scope of this invention.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware comprising several distinct elements.

I claim:

1. A method for installing software on a client computer, the method comprising the steps of:
    the client computer receiving a list identifying the software to be installed on the client computer;
    the client computer determining that an application that is started on the client computer is not listed in a start-up menu on the client computer;
    the client computer saving a state of the application in response to the client computer determining that the application is not listed in the start-up menu;
    the client computer installing the software on the client computer in response to the client computer saving the state of the application;
    rebooting the client computer after the step of installing the software; and
    the client computer restoring the state of the application on the client computer after the step of rebooting the client computer.

2. The method of claim 1, further comprising:
    before the step of installing the software, the client computer indicating, that the software is available for installing on the client computer.

3. The method of claim 2, wherein the step of indicating that the software is available for installing on the client computer comprises:
    the client computer providing a visual indicator indicating that the software is available for installing on the client computer.

4. The method of claim 1, further comprising:
    before the step of installing the software, the client computer authenticating one of the client computer and a user of the client computer.

5. The method of claim 1, wherein the step of saying the state of the application comprises the client computer saying the state of the application in a log file having a pre-defined format.

6. The method of claim 5, wherein the step of saving the state of the application further comprises the client computer storing, in the log file, one or more of a name of a document opened in the application, a uniform resource locator of the document, a cursor location within the document, a name of a file that starts the application, and a password corresponding to the application.

7. The method of claim 6, further comprising:
before the step of storing, in the log file, the password corresponding to the application, the client computer encrypting the password.

8. The method of claim 1, further comprising
the client computer removing temporary files created during the step of installing the software after the step of installing the software; and
the client computer generating a report after the step of installing the software.

9. A computer system for installing software on a client computer, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to receive a list identifying the software to be installed on the client computer;
program instructions, stored on at least one of the one or more storage devices for execution by at least one of the one or more processors via at least one of the one or more memories, to determine that an application that is started on the client computer is not listed in a start-up menu on the client computer;
program instructions, stored on at least one of the one or more storage devices for execution by at least one of the one or more processors via at least one of the one or more memories, to save a state of the application in response to determining that the application is not listed in the start-up menu;
program instructions, stored on at least one of the one or more storage devices for execution by at least one of the one or more processors via at least one of the one or more memories, to install the software on the client computer in response to saving the state of the application;
program instructions, stored on at least one of the one or more storage devices for execution by at least one of the one or more processors via at least one of the one or more memories, to reboot the client computer after installing the software; and
program instructions, stored on at least one of the one or more storage devices for execution by at least one of the one or more processors via at least one of the one or more memories, to restore the state of the application on the client computer after rebooting the client computer.

10. The computer system of claim 9, further comprising program instructions, stored on at least one of the one or more storage devices for execution by at least one of the one or more processors via at least one of the one or more memories, to indicate, before installing the software, that the software is available for installing on the client computer.

11. The computer system of claim 9, wherein the program instructions to save the state of the application save the state of the application in a log file having a pre-defined format.

12. The computer system of claim 9, wherein the software is a software application or a software update.

13. The computer system of claim 12, wherein the program instructions to save the state of the application store, in the log file, one or more of a name of a document opened in the application, a uniform resource locator of the document, a cursor location within the document, a name of a file that starts the application, and a password corresponding to the application.

14. The computer system of claim 13, wherein the program instructions to save the state of the application encrypt the password before storing the password in the log file.

15. A computer program product comprising one or more computer-readable, tangible storage devices and computer-readable program instructions which are stored on the one or more storage devices and when executed by one or more processors, perform the method of claim 1.

16. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

17. The computer system of claim 11, further comprising:
program instructions, stored on at least one of the one or more storage devices for execution by at least one of the one or more processors via at least one of the one or more memories, to remove temporary files created while installing the software after installing the software; and
program instructions, stored on at least one of the one or more storage devices for execution by at least one of the one or more processors via at least one of the one or more memories, to generate a report after installing the software.

18. A computer program product for installing software on a client computer, the computer program product comprising:
one or more computer-readable tangible storage devices;
program instructions, stored on at least one of the one or more storage devices, to receive a list identifying the software to be installed on the client computer;
program instructions, stored on at least one of the one or more storage devices, to determine that an application that is started on the client computer is not listed in a start-up menu on the client computer;
program instructions, stored on at least one of the one or more storage devices, to save a state of the application in response to determining that the application is not listed in the start-up menu;
program instructions, stored on at least one of the one or more storage devices, to install the software on the client computer in response to saving the state of the application;
program instructions, stored on at least one of the one or more storage devices, to reboot the client computer after installing the software; and
program instructions, stored on at least one of the one or more storage devices, to restore the state of the applications on the client computer after rebooting the client computer.

19. The computer program product of claim 18, wherein the program instructions to save the state of the application save the state of the application in a log file having a pre-defined format.

20. The computer system of claim 11, further comprising:
program instructions, stored on at least one of the one or more storage devices for execution by at least one of the one or more processors via at least one of the one or more memories, to authenticate one of the client computer and a user of the client computer before installing the software.

21. A computer program product comprising one or more computer-readable tangible storage devices and computer-readable program instructions which are stored on the one or more storage devices and when executed by one or more processors perform the method of claim 1.

22. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

23. The computer system of claim 10, further comprising program instructions, stored on at least one of the one or more storage devices for execution by at least one of the one or more processors via at least one of the one or more memories, to indicate, before installing the software, that the software is available for installing on the client computer.

24. The computer program product of claim 23, wherein the program instructions to save the state of the application save the state of the application in a log file having a predefined format.

25. The computer program product of claim 24, wherein the program instructions to save the state of the application store, in the log file, one or more of a name of a document opened in the application, a uniform resource locator of the document, a cursor location within the document, a name of a file that starts the application, and a password corresponding to the application.

26. The computer program product of claim 25, wherein the program instructions to save the state of the application encrypt the password before storing the password in the log file.

27. The computer program product of claim 23, further comprising:
   program instructions, stored on at least one of the one or more storage devices, to authenticate one of the client computer and a user of the client computer before installing the software.

28. The computer program product of claim 23, wherein the program instructions to save the state of the application save the state of the application in a log file having a predefined format.

29. The computer program product of claim 23, wherein the software is a software application or a software update.

30. The computer program product of claim 23, wherein the program instructions to install the software fetch the software from a remote server over a network.

31. The computer program product of claim 23, further comprising:
   program instructions, stored on at least one of the one or more storage devices, to remove temporary files created while installing the software after installing the software; and
   program instructions, stored on at least one of the one or more storage devices, to generate a report after installing the software.

32. The computer program product of claim 23, further comprising program instructions, stored on at least one of the one or more storage devices, to indicate, before installing the software, that the software is available for installing on the client computer.

33. The computer program product of claim 32, wherein the program instructions to indicate, before installing the software, that the software is available for installing on the client computer provide a visual indicator indicating that the software is available for installing on the client computer.

* * * * *